US 008514188B2

(12) United States Patent
Hoover et al.

(10) Patent No.: US 8,514,188 B2
(45) Date of Patent: Aug. 20, 2013

(54) HAND POSTURE MODE CONSTRAINTS ON TOUCH INPUT

(75) Inventors: Paul Armistead Hoover, Kirkland, WA (US); Maxim Oustiogov, Seattle, WA (US); Daniel J. Wigdor, Seattle, WA (US); Hrvoje Benko, Seattle, WA (US); Jarrod Lombardo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 12/650,089

(22) Filed: Dec. 30, 2009

(65) Prior Publication Data

US 2011/0157025 A1   Jun. 30, 2011

(51) Int. Cl.
*G06F 3/41* (2006.01)

(52) U.S. Cl.
USPC .......................................... 345/173; 345/178

(58) Field of Classification Search
USPC ......... 345/156–184, 420, 427, 473; 715/764, 715/850; 700/83, 86, 182; 703/1, 11, 22; 463/20, 36; 382/118
See application file for complete search history.

(56) References Cited

U.S. PATENT DOCUMENTS

| | | | | |
|---|---|---|---|---|
| 5,999,185 A * | 12/1999 | Kato et al. | ..................... | 345/420 |
| 6,842,175 B1 * | 1/2005 | Schmalstieg et al. | ......... | 345/427 |
| 7,705,830 B2 * | 4/2010 | Westerman et al. | .......... | 345/173 |
| 2003/0214481 A1 * | 11/2003 | Xiong | ............................ | 345/157 |
| 2004/0028260 A1 * | 2/2004 | Higaki et al. | ................. | 382/118 |
| 2007/0229477 A1 * | 10/2007 | Ludwig | .......................... | 345/173 |
| 2007/0262964 A1 | 11/2007 | Zotov et al. | | |
| 2008/0211766 A1 | 9/2008 | Westerman et al. | | |
| 2009/0079700 A1 | 3/2009 | Abernathy | | |
| 2009/0102800 A1 * | 4/2009 | Keenan | .......................... | 345/173 |
| 2009/0184939 A1 | 7/2009 | Wohlstadter et al. | | |
| 2010/0103118 A1 * | 4/2010 | Townsend et al. | ............ | 345/173 |
| 2010/0151946 A1 * | 6/2010 | Wilson et al. | .................... | 463/36 |
| 2010/0208033 A1 * | 8/2010 | Edge et al. | ...................... | 348/46 |
| 2010/0211897 A1 * | 8/2010 | Cohen et al. | ................... | 715/764 |
| 2010/0212571 A1 * | 8/2010 | White | ........................... | 114/315 |
| 2010/0214243 A1 * | 8/2010 | Birnbaum et al. | ............ | 345/173 |
| 2010/0215257 A1 * | 8/2010 | Dariush et al. | ................ | 382/159 |
| 2010/0234094 A1 * | 9/2010 | Gagner et al. | ................... | 463/20 |
| 2010/0305929 A1 * | 12/2010 | Andersen et al. | ............... | 703/11 |
| 2011/0107270 A1 * | 5/2011 | Wang et al. | .................... | 715/850 |
| 2011/0218953 A1 * | 9/2011 | Hale et al. | ........................ | 706/46 |

OTHER PUBLICATIONS

"NextWindow's Multi-Touch Overview", Retrieved at <<http://www.touch-base.com/documentation/Documents/nextwindow_multitouch.pdf>> 2007, pp. 7.

(Continued)

*Primary Examiner* — Prabodh M Dharia
(74) *Attorney, Agent, or Firm* — Alleman Hall McCoy Russell & Tuttle LLP (57) ABSTRACT

A method of controlling a virtual object within a virtual workspace includes recognizing a hand posture of an initial touch gesture directed to a touch-input receptor, and a mode constraint is set based on the hand posture. The mode constraint specifies a constrained parameter of a virtual object that is to be maintained responsive to a subsequent touch gesture. The method further includes recognizing a subsequent touch gesture directed to the touch-input receptor. An unconstrained parameter of the virtual object is modulated responsive to the subsequent touch gesture while the constrained parameter of the virtual object is maintained in accordance with the mode constraint.

20 Claims, 10 Drawing Sheets

(56) References Cited

OTHER PUBLICATIONS

Ring Scott, "Microsoft Surface's Natural User Interface Technology", Retrieved at <<http://ezinearticles.com/?Microsoft-Surfaces-Natural-User-Interface-Technology&id=2770159>> 2009, pp. 3.

Malik, et al., "Interacting with Large Displays from a Distance with Vision-Tracked Multi-Finger Gestural Input", Retrieved at <<http://delivery.acm.org/10.1145/1100000/1095042/p43-malik.pdf?key1=1095042&key2=0524523521&coll=GUIDE&dl=GUIDE&CFID=53390728&CFTOKEN=24030313>> In the proceedings of the 18th annual ACM symposium on User interface software and technology,Oct. 23-27, 2005, pp. 43-52.

Wilson, Andrew D., "PlayAnywhere: A Compact Interactive Tabletop Projection-Vision System", Retrieved at <<http://delivery.acm.org/10.1145/1100000/1095047/p83-wilson.pdf?key1=1095047&key2=8478523521&coll=GUIDE&dl=GUIDE&CFID=53398089&CFTOKEN=54379160>> In the proceedings of the 18th annual ACM symposium on User interface software and technology , Oct. 23-27, 2005, pp. 83-92.

\* cited by examiner

HAND POSTURE MODE CONSTRAINTS ON TOUCH INPUT

BACKGROUND

A touch display is a display that serves the dual function of visually presenting information and receiving user input. Touch displays may be utilized with a variety of different devices to provide a user with an intuitive input mechanism that can be directly linked to information visually presented by the touch display. A user may use touch input to push soft buttons, turn soft dials, size objects, orientate objects, or perform a variety of different inputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to some aspects of this disclosure, touch input is constrained based on the hand posture of a hand executing the touch input. The hand posture of a touch gesture may be used to set a mode constraint that specifies a constrained parameter of a virtual object that is to be maintained responsive to subsequent touch input. Once a mode constraint is set, an unconstrained parameter of the virtual object may be modulated responsive to subsequent touch input while the constrained parameter is left unchanged.

DETAILED DESCRIPTION

Figure 1:
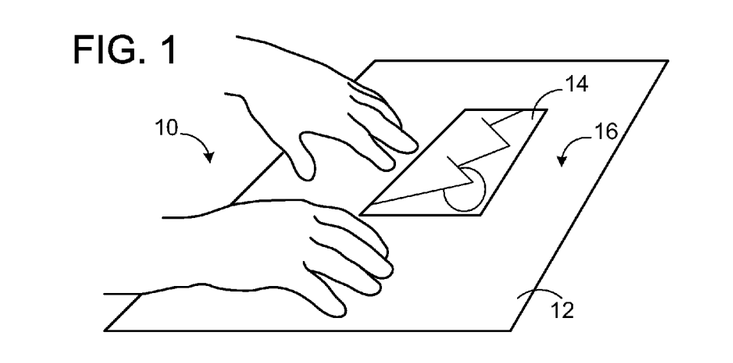
FIG. 1 shows an example touch display presenting a virtual workspace including a virtual object.

FIG. 1 shows a computing system 10 including a touch display 12. Touch display 12 may serve as both a display and a multi-touch input mechanism that can recognize touch contacts at a plurality of neighboring and/or separated regions (e.g., pixels) of the touch display. As such, computing system 10 is capable of recognizing that one or more user hands are in contact with the touch display 12.

Computing system 10 is also capable of recognizing the shapes of the contact patches where each user hand is contacting touch display 12. These shapes may be referred to as contact silhouettes of the user hands. The contact silhouettes can be correlated to different user hand postures so that computing system 10 may recognize different user hand postures based on the contact silhouettes detected by touch display 12. As described below, different hand postures may be linked to different mode constraints, which can be used to provide a user with increased levels of control when manipulating or otherwise controlling a virtual object 14 in a virtual workspace 16.

Figure 2:
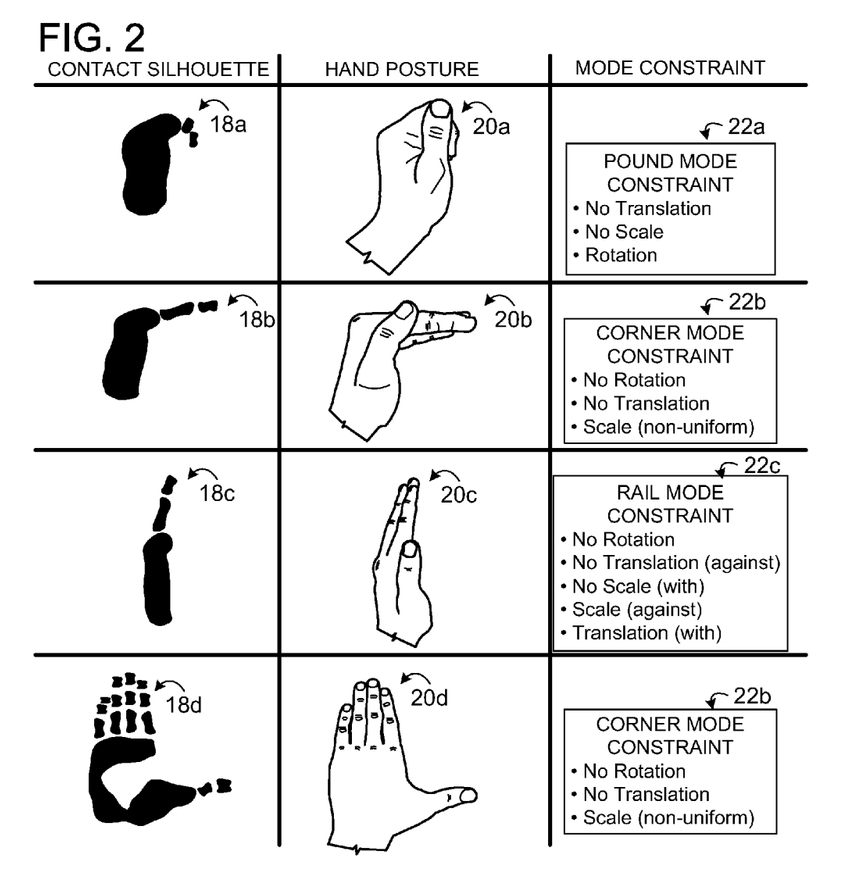
FIG. 2 shows an example set of hand postures and associated contact silhouettes and mode constraints.

FIG. 2 schematically shows a nonlimiting set of example contact silhouettes, including contact silhouette 18a, contact silhouette 18b, contact silhouette 18c, and contact silhouette 18d. For each contact silhouette, FIG. 2 schematically shows an exemplary hand posture that could have produced that contact silhouette. In particular, FIG. 2 shows hand posture 20a, hand posture 20b, hand posture 20c, and hand posture 20d. While FIG. 2 shows a one to one correspondence between contact silhouettes and hand postures, it is to be understood that a hand posture may produce a variety of different contact silhouettes depending on such factors as hand size, hand morphology, contact pressure, hand orientation, etc. As such, a particular hand posture may be associated with a variety of different contact silhouettes. As used herein, the phrase "hand posture" may be used to refer to a set of contact silhouettes that are associated with a common mode constraint.

FIG. 2 also schematically shows different mode constraints associated with each hand posture. In particular, FIG. 2 shows pound mode constraint 22a, corner mode constraint 22b, and rail mode constraint 22c. Each mode constraint may specify one or more constrained parameters and/or one or more unconstrained parameters of a virtual object. When a mode constraint is applied to a virtual object, the constrained parameters associated with that mode constraint are maintained responsive to a subsequent touch gesture, and the unconstrained parameters associated with that mode constraint may be modulated responsive to the subsequent touch gesture. In other words, one or more parameters of the virtual object are effectively locked, while one or more other parameters are allowed to be changed. By locking one or more parameters, it may be easier for a user to selectively control the virtual object, because the constrained parameter that would otherwise be modulated responsive to the subsequent touch gesture is prevented from changing.

Figure 3:
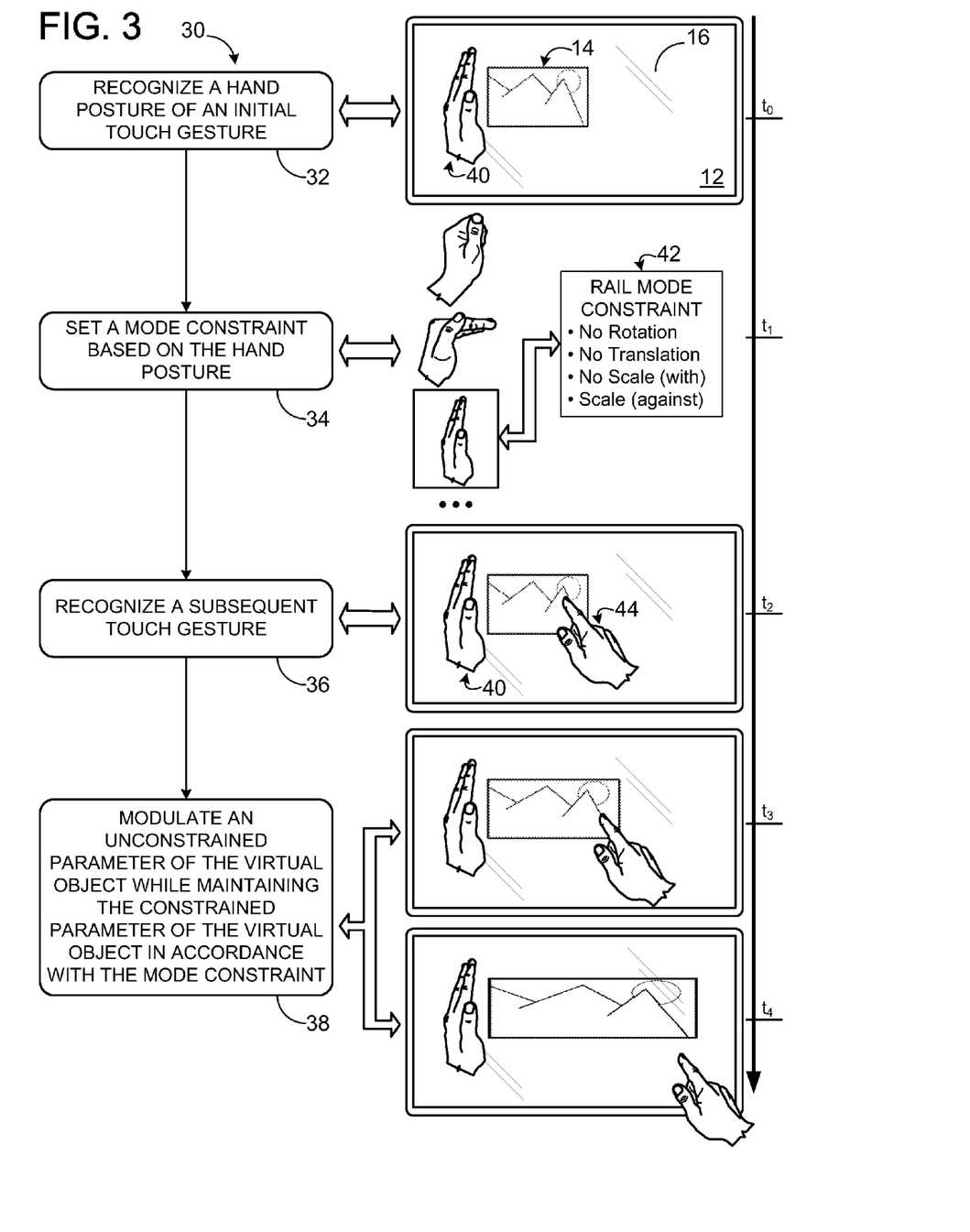
FIG. 3 shows a method of controlling a virtual object within a virtual workspace in accordance with an embodiment of the present disclosure.

FIG. 3 shows an example method 30 of controlling a virtual object within a virtual workspace. At 32 method 30 includes recognizing a hand posture of an initial touch gesture directed to a touch-input receptor. The hand posture of the touch gesture may be recognized by a touch display and cooperating computing system or another type of touch-input receptor. The hand posture may be recognized by analyzing a contact silhouette of the touch gesture. As nonlimiting examples, the field above a touch-input receptor may be captured, such as with a capacitive sensor array or camera. The outline of objects (e.g., hands) in the field may then be found. As a nonlimiting example, a Marching Squares algorithm may be used to find an outline of such objects. An outline may then be compared to a collection of silhouette templates. If one of the templates matches the outline with sufficient certainty, then the silhouette corresponding to that template may be selected.

At to, FIG. 3 shows a nonlimiting example of a left hand 40 performing a touch gesture on touch display 12. The touch display 12 is displaying virtual workspace 16 that includes virtual object 14.

At 34, method 30 includes setting a mode constraint based on the hand posture recognized at 32. As introduced above with reference to FIG. 2, a plurality of different mode constraints may be used to control a virtual object within a virtual workspace. Each of the plurality of different mode constraints may be associated with one or more different hand postures and one or more corresponding contact silhouettes. The hand posture and/or contact silhouette recognized by a touch-input receptor may be used to select one of the plurality of different mode constraints to apply to a virtual object. A selected mode constraint may specify a set of one or more constrained parameters and one or more unconstrained parameters for a virtual object.

At $t_1$, FIG. 3 schematically shows a rail mode constraint 42 being set based on the rail hand posture recognized at 32. In this example, a rail hand posture is characterized by a substantially straight, elongated contact silhouette. If a different hand posture had been recognized, a mode constraint corresponding to that different hand posture would be set.

A mode constraint is set with respect to a virtual object. For example, in FIG. 3, the rail mode constraint 42 is set with respect to virtual object 14. A variety of different conditions may be used to determine for which virtual object a mode constraint is to be set. The proximity of the touch gesture to the virtual object and the orientation of the touch gesture relative to the virtual object are two nonlimiting examples of conditions that can be used to determine the virtual object to which a mode constraint is to be applied.

Furthermore, the orientation of the hand posture of a touch gesture and/or the location of the touch gesture relative to a virtual object may be used to control how a mode constraint is applied to a the virtual object. As nonlimiting examples, the orientation of a hand posture may be used to select a constrained axis. In the example shown in FIG. 3, left hand 40 is substantially aligned with the y-axis of virtual workspace 16 and is facing the x-axis of virtual workspace 16. In this example, mode constraint 42 allows scaling against the rail hand posture (i.e., x-axis scaling), but prevents scaling with the rail hand posture (i.e., y-axis scaling). As described with reference to FIG. 6, the orientation of the hand posture may be changed to change the constraints.

At 36, method 30 includes recognizing a subsequent touch gesture. At $t_2$, $t_3$, and $t_4$, FIG. 3 shows a nonlimiting example of a right hand 44 performing the subsequent touch gesture on touch display 12.

At 38, method 30 includes modulating an unconstrained parameter of the virtual object responsive to the subsequent touch gesture while maintaining the constrained parameter of the virtual object in accordance with the set mode constraint. At $t_3$ and $t_4$, FIG. 3 shows a nonlimiting example of an unconstrained x-axis scale parameter of virtual object 14 being modulated while the constrained y-axis scale, rotation, and translation parameters of the virtual object 14 are maintained. In this way, the user is able to adjust the width of virtual object 14 without accidentally adjusting the height, orientation, or position of virtual object 14. To adjust another aspect of the virtual object with this type of control and precision, the user may set a different mode constraint using a different hand posture.

The rail mode constraint described above is nonlimiting, and method 30 is compatible with virtually any mode constraint. Furthermore, the constrained parameters and unconstrained parameters associated with mode constraint 42 in FIG. 3 are provided as examples. A rail mode constraint may included additional and/or alternative constrained parameters and/or unconstrained parameters.

Figure 4:
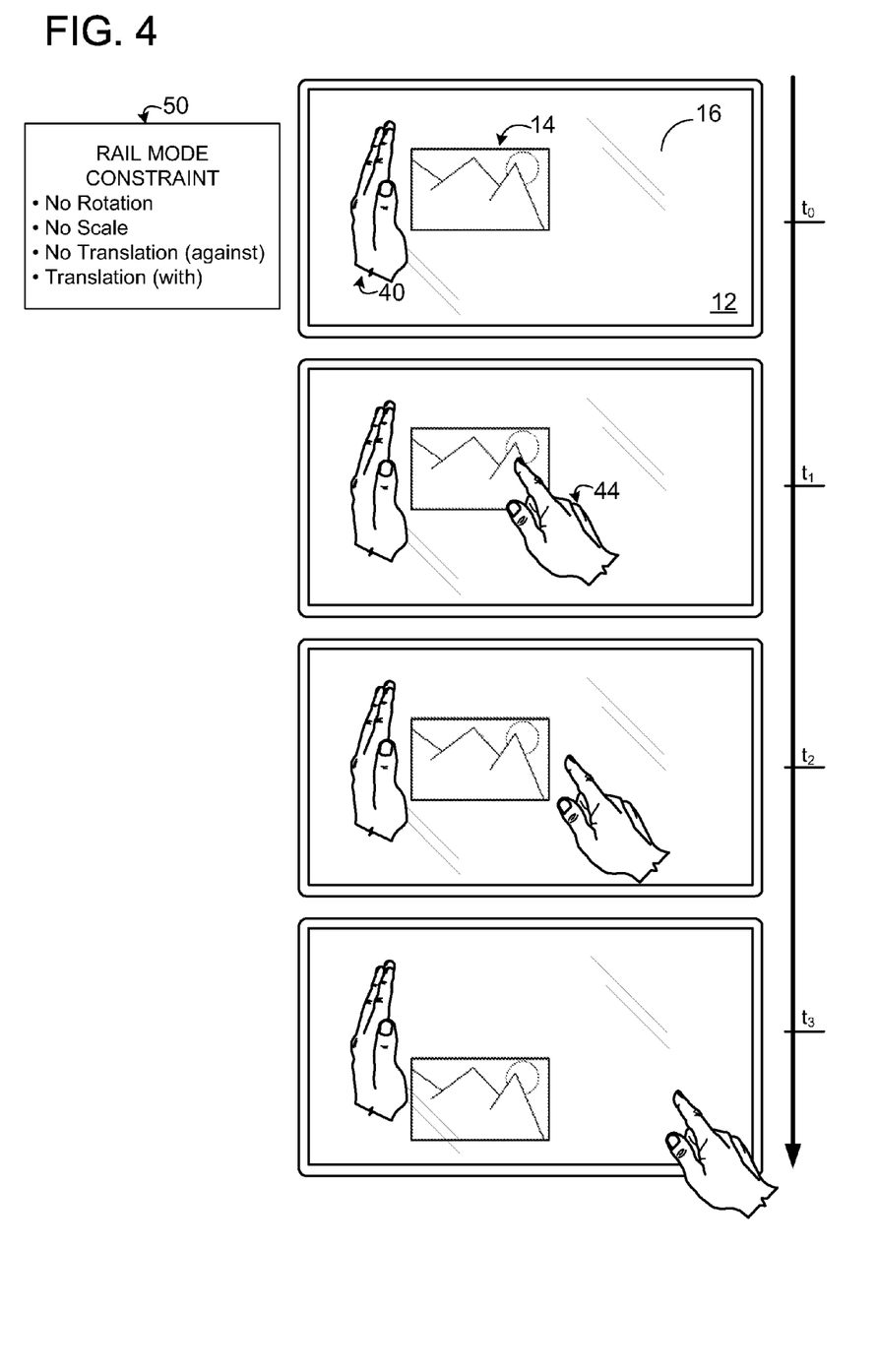
FIG. 4 shows an example touch input sequence in which a rail mode constraint is set.
Figure 5:
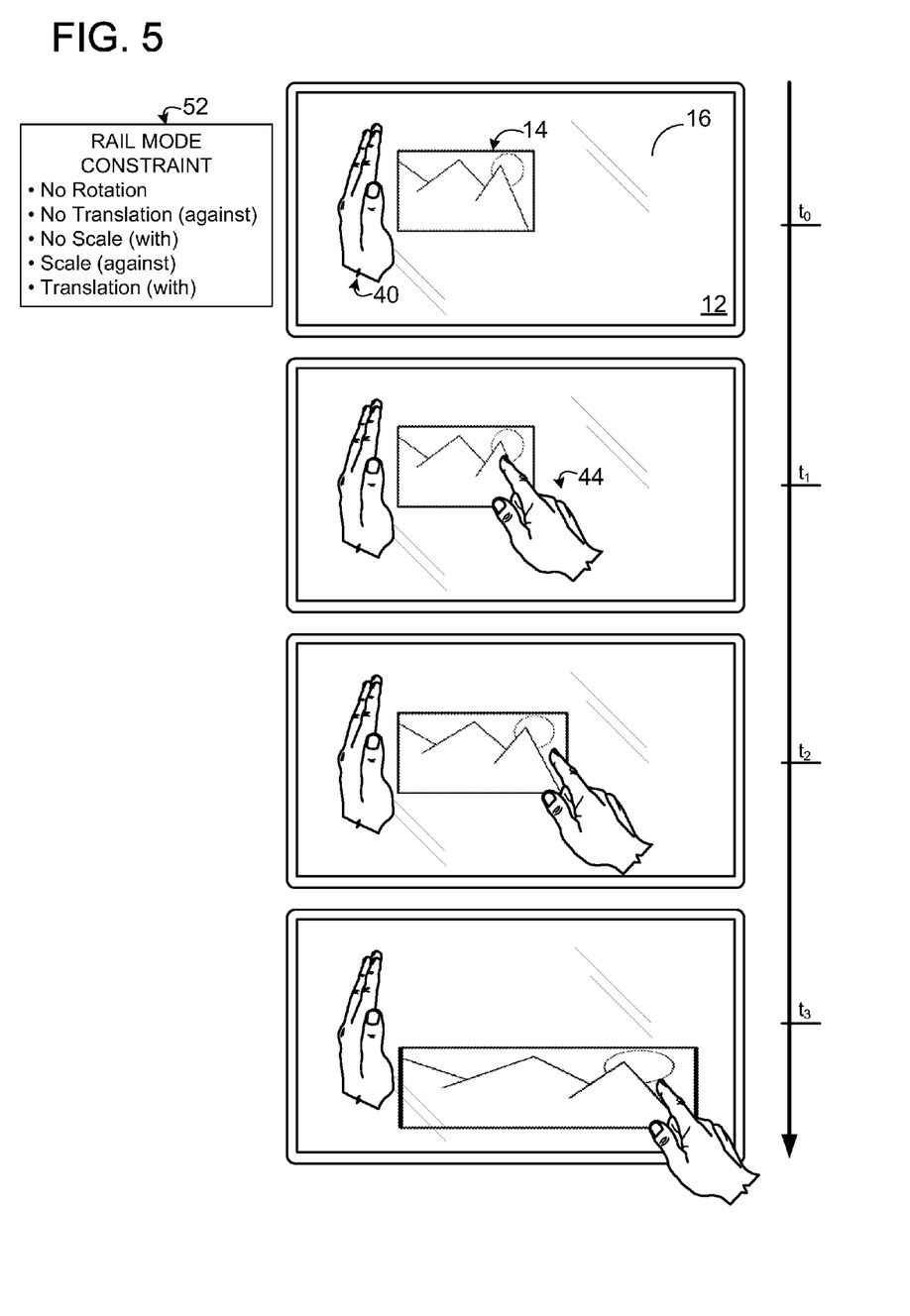
FIG. 5 shows another example touch input sequence in which a different rail mode constraint is set.

For example, FIG. 4 shows a rail mode constraint 50 that does not allow any scaling, but does allow translation in the direction of the rail hand posture. As yet another example, FIG. 5 shows a rail mode constraint 52 that does not allow scaling in the direction of the rail hand posture nor translation against the direction of the rail hand posture, but does allow scaling against the direction of the rail hand posture and translation in the direction of the rail hand posture.

These examples are provided to demonstrate that a variety of different combinations of constrained parameters and unconstrained parameters may be associated with a particular hand posture. While a rotation constraint is associated with each of the example rail mode constraints provided above, a different rail mode constraint may treat rotation as an unconstrained parameter. The examples provided herein are not limiting.

As described above, two touch gestures cooperate to control a virtual object. One touch gesture is described as an initial touch gesture and the other touch gesture is described as a subsequent touch gesture. It should be understood that the initial touch gesture may interrupt another gesture that is in progress, in which case a portion of the interrupted gesture that occurs after the initial touch gesture begins may be considered the subsequent touch gesture. In other words, the initial touch gesture that sets the mode constraint can be executed after a precursor to the subsequent touch gesture has already begun. Furthermore, the initial touch gesture and the subsequent touch gesture may begin at substantially the same time.

Figure 6:
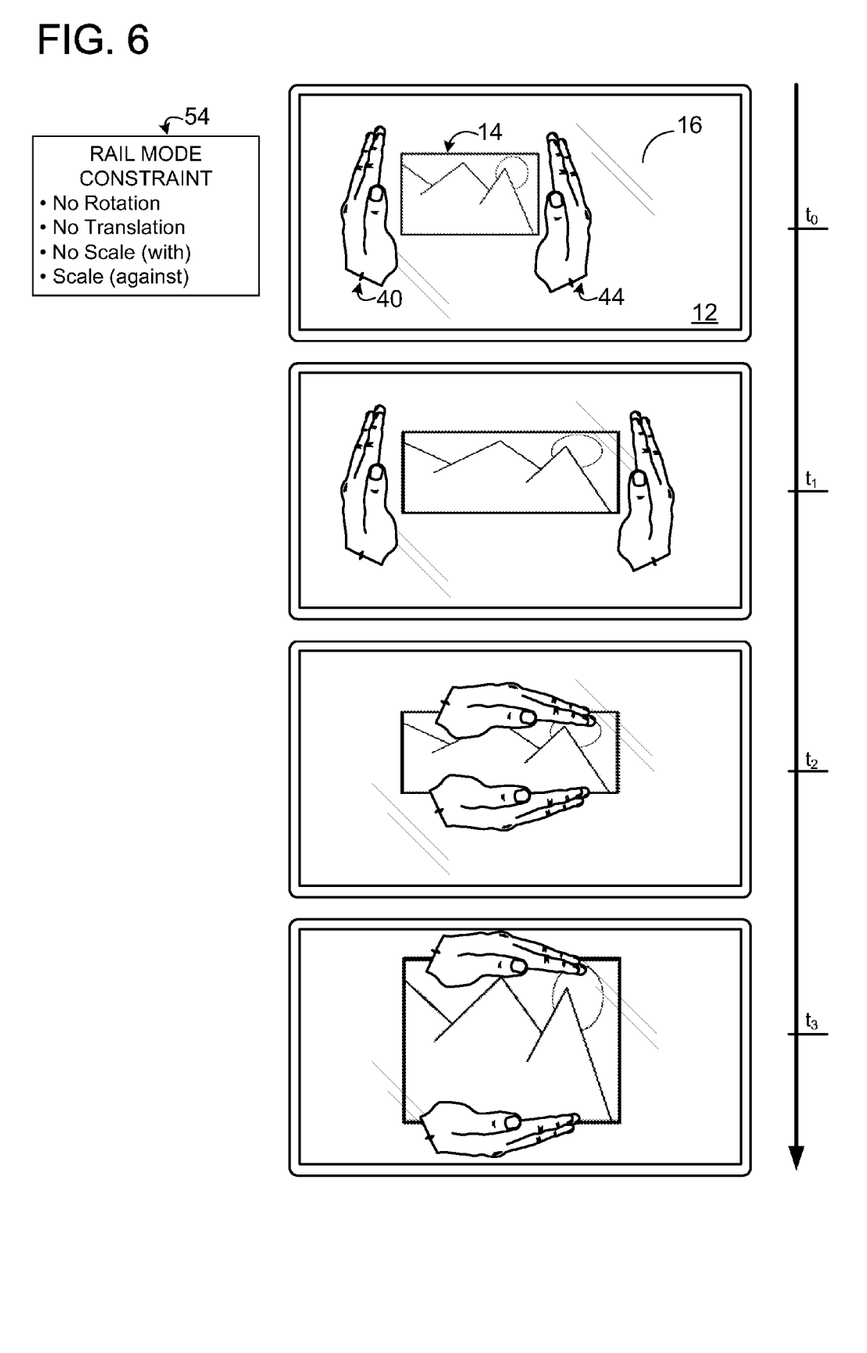
FIG. 6 shows another example touch input sequence in which two hands with rail hand posture are used to set a rail mode constraint.

FIG. 6 shows an example in which the initial touch gesture and the subsequent touch gesture begin substantially simultaneously. At to, a left hand 40 and a right hand 44 execute rail gestures. At $t_1$, the right hand moves to the right and virtual object 14 stretches in accordance with rail mode constraint 54. That is, virtual object 14 scales in the x-direction, against the opposing rail hand postures. When the hands are in this orientation, virtual object 14 will not scale in the y-direction according to rail mode constraint 54. At $t_2$, the left hand 40 and the right hand 44 are orientated so that virtual object 14 may be scaled in the y-direction against the opposing rail hand postures. When the hands are in this new orientation, virtual object 14 will not scale in the x-direction. This example shows how the orientation of a hand posture may determine how a mode constraint is applied (e.g., which axis is locked from scaling). One or more tolerances in hand posture orientation or position may be used to determine how to apply a mode constraint. Furthermore, the mode constraint may be selected based on the hand posture of both the initial touch gesture and the hand posture of the subsequent touch gesture. As an example, rail mode constraint 54 may optionally only be set if the subsequent touch gesture is also performed with a rail hand posture, as shown.

Figure 7:
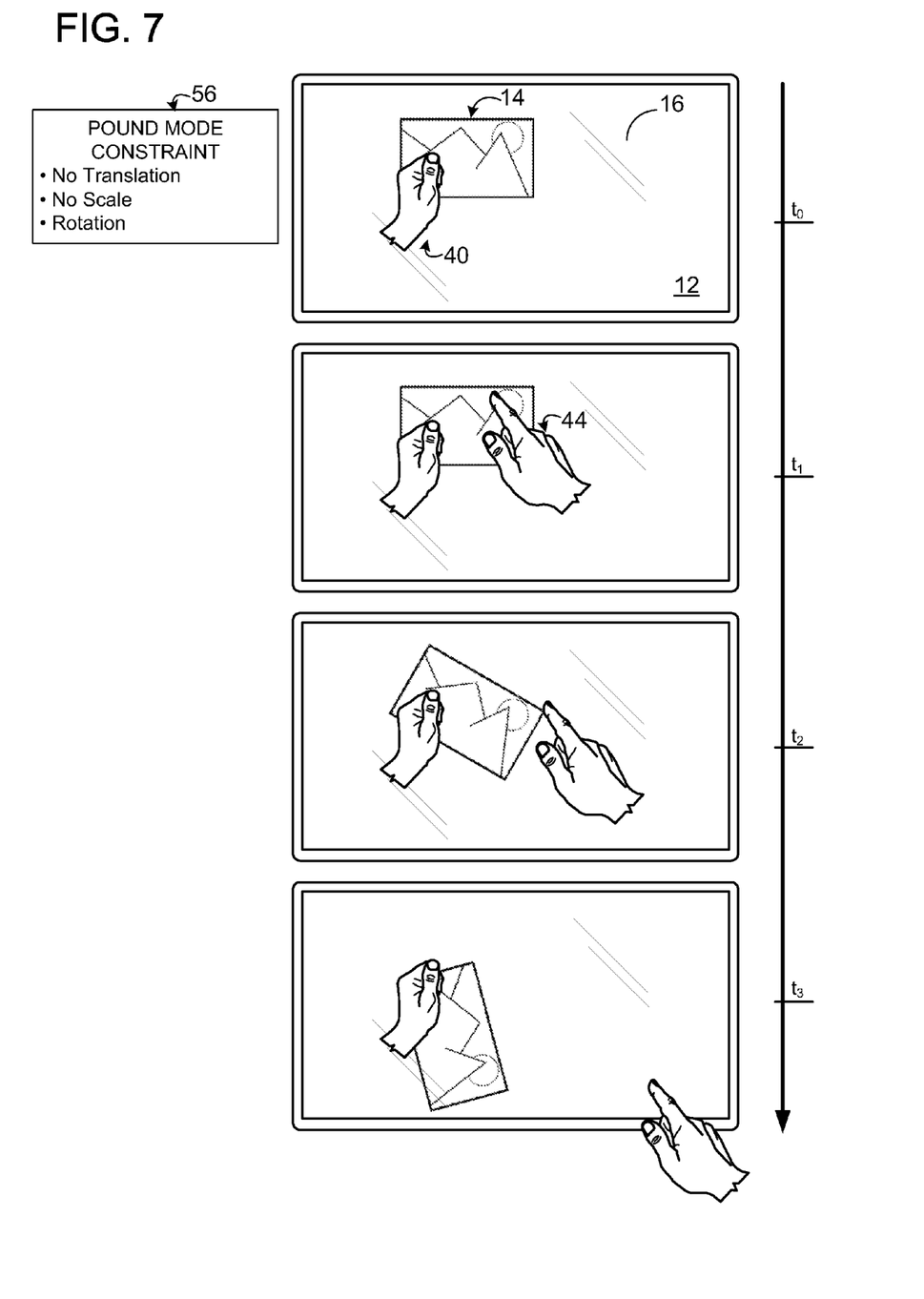
FIG. 7 shows another example touch input sequence in which a pound mode constraint is set.

FIG. 7 shows an example pound mode constraint 56 that includes a translation constraint and a scale constraint, but which allows rotation. The pound mode constraint is set responsive to a pound gesture. A pound gesture may be characterized by a fist-shaped contact silhouette.

Figure 8:
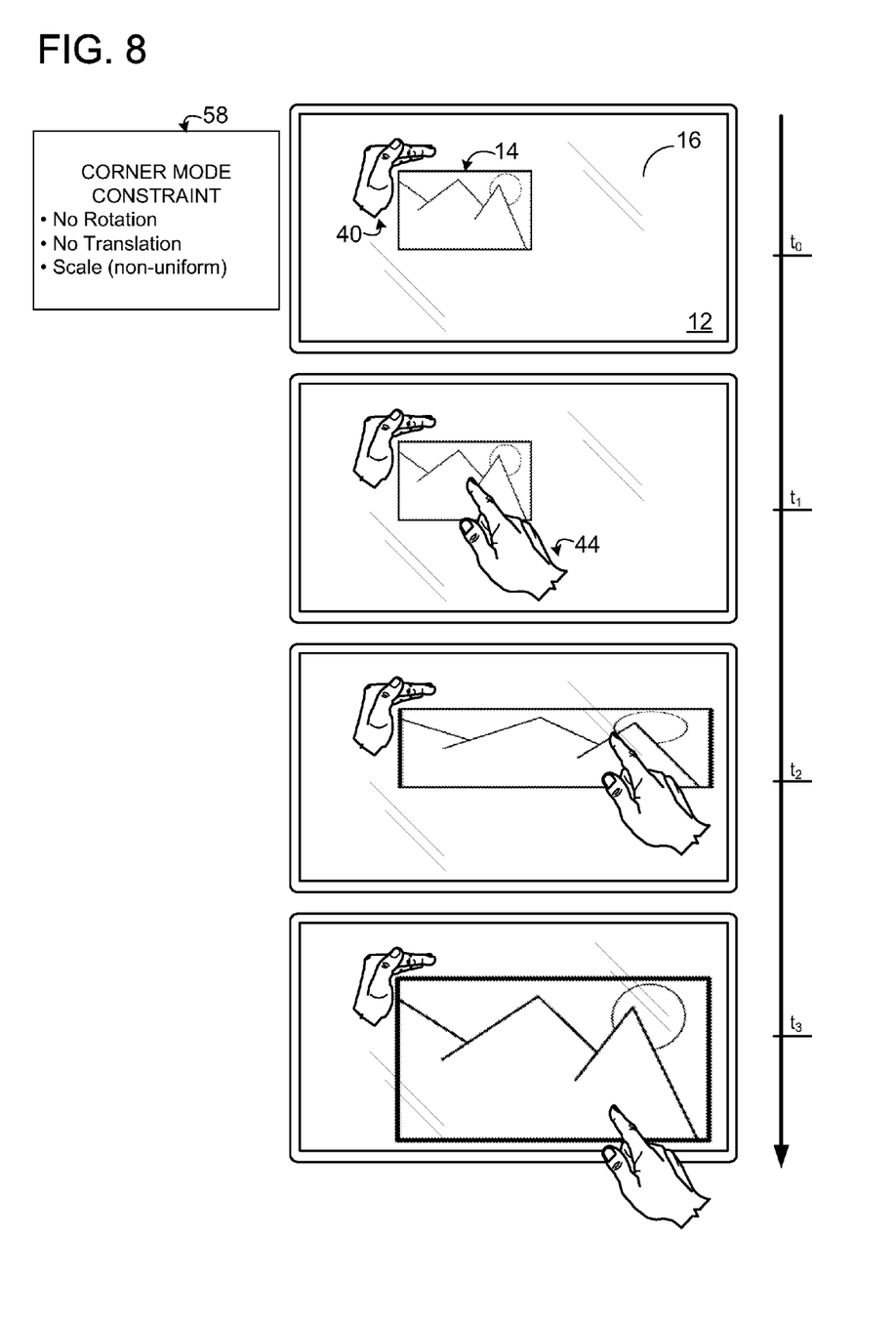
FIG. 8 shows another example touch input sequence in which a corner mode constraint is set.

FIG. 8 shows an example corner mode constraint 58 that includes a translation constraint and a rotation constraint, but which allows non-uniform scaling. That is, corner mode constraint 58 allows x-axis scaling and y-axis scaling of virtual object 14 to be performed independent of one another.

The corner mode constraint is set responsive to a corner gesture. A corner gesture may be characterized by a contact silhouette having two segments forming a corner. In the illustrated example, the corner forming segments that form the contact silhouette are the side of the little finger and the side of the palm. FIG. 2 shows another example where the corner forming segments are the thumb and the side of the palm extending to the index finger.

In the examples provided above, the mode constraint is set until the initial touch gesture terminates. Using the example of FIG. 7, as long as the corner hand posture is in contact with the touch display, the corner mode constraint remains active. This may be referred to as an unpinned mode constraint.

Figure 9:
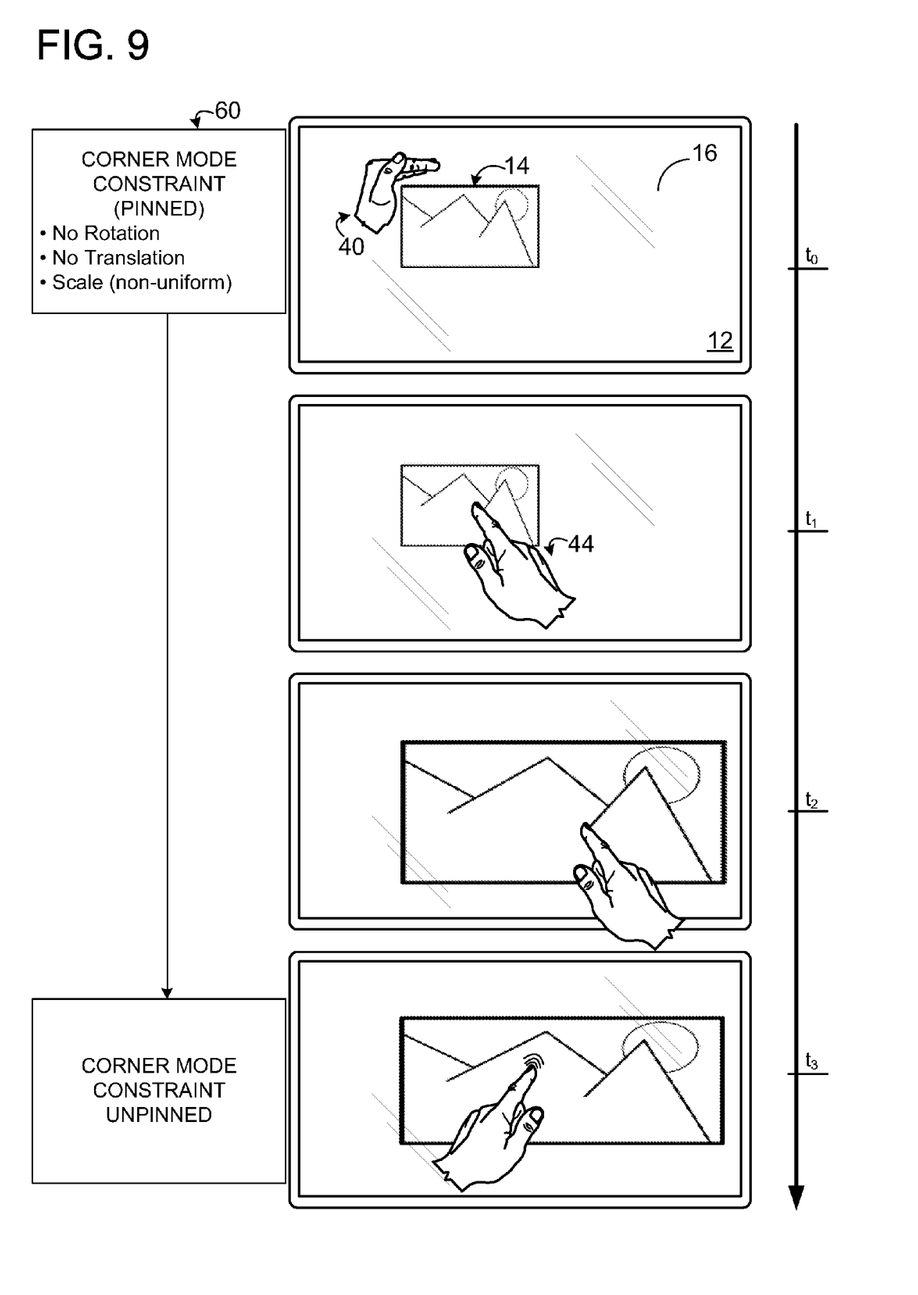
FIG. 9 shows another example touch input sequence in which a pinned corner mode constraint is set.

A pinned mode constraint may also be implemented in which the mode constraint remains set until a termination gesture is executed. FIG. 9 shows an example of a pinned corner mode constraint 60. At $t_0$, a left hand 40 in a corner hand posture contacts touch display 12 and then lifts from touch display 12. In this example, the computing system is configured to pin selected mode constraints responsive to corresponding hand postures, such as the corner hand posture. As such, even though left hand 40 loses contact with touch display 12 and the initial touch gesture is completed, the corner mode constraint remains active (i.e., pinned). As such, at $t_1$ and $t_2$, the right hand 44 performs a subsequent touch gesture that modulates the unconstrained parameters of virtual object 14 (e.g., non-uniform scaling) in accordance with pinned corner mode constraint 60. At $t_4$, left hand 40 performs a termination gesture to unpin the corner mode constraint. Various different touch gestures may be chosen to serve as a termination gesture that unpins a previously pinned mode constraint. In the illustrated nonlimiting example, a double tap gesture on virtual object 14 is used.

Figure 10:
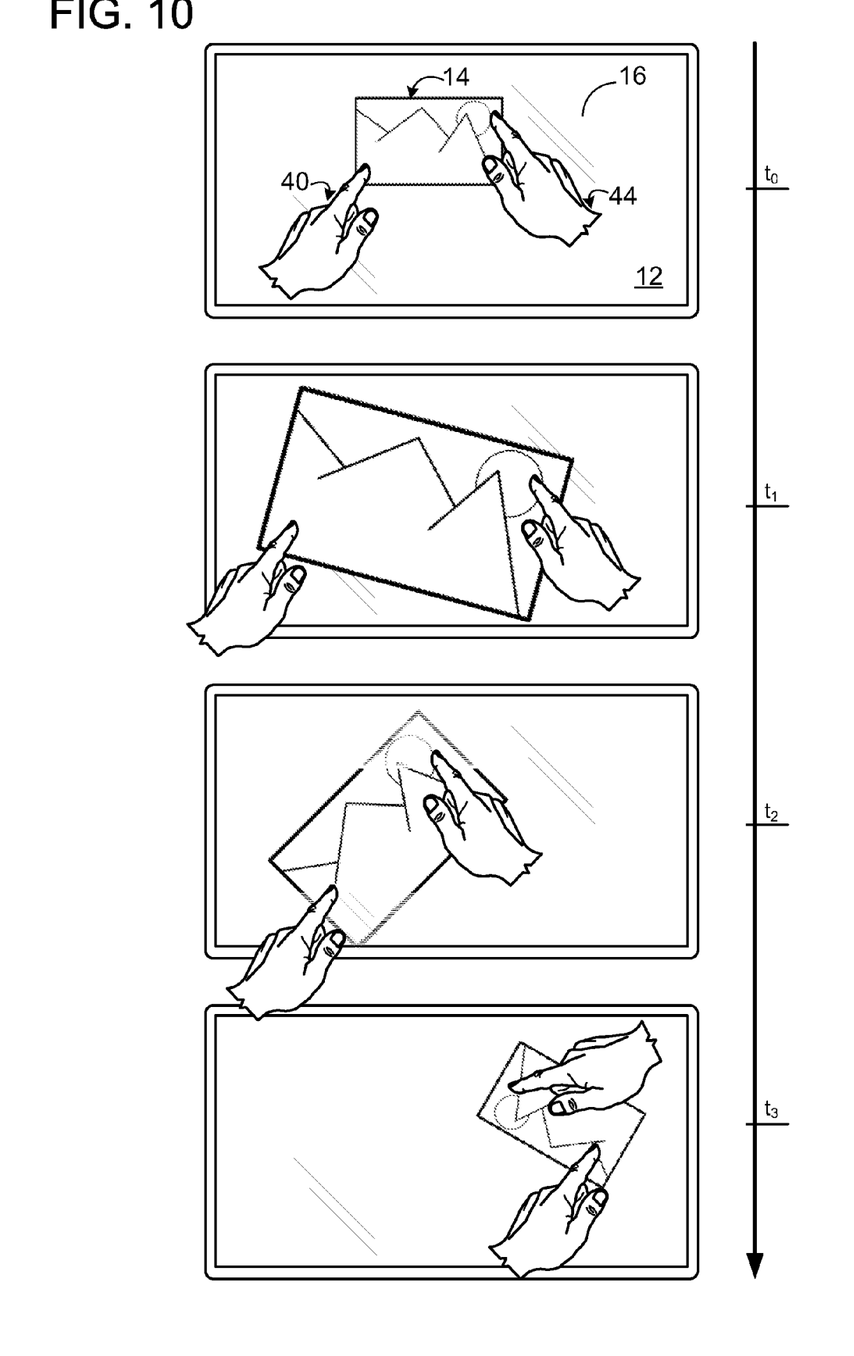
FIG. 10 shows another example touch input sequence in which no mode constraint is set.

The examples discussed above with reference to FIGS. 3-9 show how a mode constraint may be used to selectively modulate one or more parameters of a virtual object while maintaining one or more other parameters of the virtual object. Such constraints may give a user more control over a virtual object. FIG. 10 is provided as an example of default modulation in which rotation, translation, and uniform scaling may be performed simultaneously. In such scenarios, it may be difficult to prevent the virtual object from rotating or translating when scaling, from scaling or translating when rotating, etc. A library of mode constraints corresponding to different hand postures may be established so that a user may selectively constrain desired parameters of the virtual object for more controlled adjustments.

Figure 11:
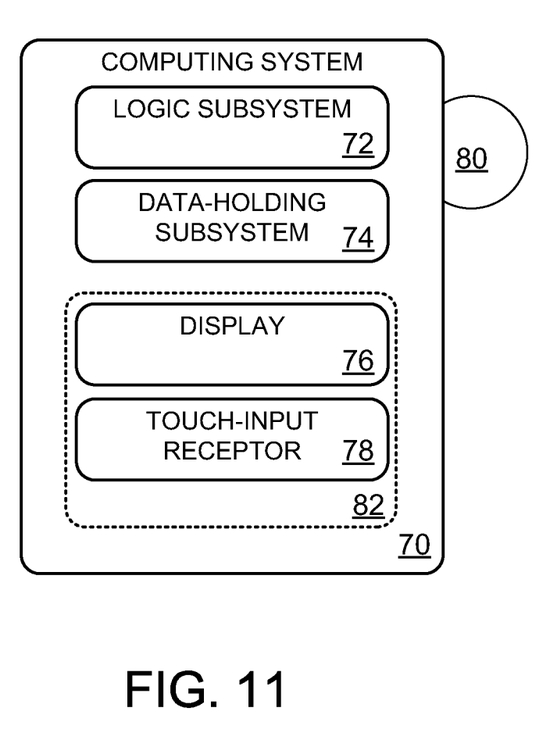
FIG. 11 shows a computing system in accordance with an embodiment of the present disclosure.

For the sake of simplicity, computing system 10 and touch display 12 are described in simplified form with respect to FIGS. 1-10. It is to be appreciated that the hand posture mode constraints described herein may be used with virtually any multi-touch input device capable of distinguishing one contact silhouette from another contact silhouette. As an example, FIG. 11 schematically shows a computing system 70 that may perform one or more of the above described methods and processes. Computing system 70 includes a logic subsystem 72 and a data-holding subsystem 74, a display 76, and a touch-input receptor 78. Computing system 70 may optionally include components not shown in FIG. 11.

Logic subsystem 72 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 74 may include one or more physical devices configured to hold data and/or instructions executable by the logic subsystem to implement the herein described methods and processes. When such methods and processes are implemented, the state of data-holding subsystem 74 may be transformed (e.g., to hold different data). Data-holding subsystem 74 may include removable media and/or built-in devices. Data-holding subsystem 74 may include optical memory devices, semiconductor memory devices, and/or magnetic memory devices, among others. Data-holding subsystem 74 may include devices with one or more of the following characteristics: volatile, nonvolatile, dynamic, static, read/write, read-only, random access, sequential access, location addressable, file addressable, and content addressable. In some embodiments, logic subsystem 72 and data-holding subsystem 74 may be integrated into one or more common devices, such as an application specific integrated circuit or a system on a chip.

FIG. 11 also shows an aspect of the data-holding subsystem in the form of computer-readable removable media 80, which may be used to store and/or transfer data and/or instructions executable to implement the herein described methods and processes.

Display 76 may be used to present a visual representation of data held by data-holding subsystem 74. As the herein described methods and processes change the data held by the data-holding subsystem, and thus transform the state of the data-holding subsystem, the state of display 76 may likewise be transformed to visually represent changes in the underlying data. As a nonlimiting example, as a parameter of a virtual object is adjusted in accordance with a mode constraint, the display 76 may change the visual appearance of the virtual object in accordance with the adjustments to the parameter. Display 76 may include one or more display devices utilizing virtually any type of technology. Such display devices may be combined with logic subsystem 72 and/or data-holding subsystem 74 in a shared enclosure, or such display devices may be peripheral display devices.

Touch-input receptor 78 may be used to recognize multi-touch user input. The touch-input receptor and the display may optionally be integrated into a touch screen 82 that serves as both display 76 and touch-input receptor 78. For example, a surface computing device that includes a rear projection display and an infrared vision, touch detection system may be used. In other embodiments, the touch-input receptor may be separate from the display. For example, a multi-touch track pad may serve as the touch-input receptor.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of controlling a virtual object within a virtual workspace, comprising:
   recognizing a hand posture of an initial touch gesture directed to a touch-input receptor;
   setting a mode constraint based on the hand posture, the mode constraint specifying a constrained parameter of a virtual object that is to be maintained responsive to a subsequent touch gesture;
   recognizing a subsequent touch gesture directed to the touch-input receptor; and
   modulating an unconstrained parameter of the virtual object responsive to the subsequent touch gesture while maintaining the constrained parameter of the virtual object in accordance with the mode constraint.

2. The method of claim 1, where the mode constraint specifies a plurality of constrained parameters of the virtual object that are to be maintained responsive to the subsequent touch gesture.

3. The method of claim 1, where the mode constraint further specifies one or more unconstrained parameters of the virtual object that are to be modulated responsive to the subsequent touch gesture.

4. The method of claim 1, where the mode constraint is one of a plurality of different mode constraints, each of the plurality of different mode constraints being associated with a different hand posture and specifying a different set of one or more constrained parameters and one or more unconstrained parameters.

5. The method of claim 1, where recognizing the subsequent touch gesture includes recognizing a hand posture of the subsequent touch gesture, and where the mode constraint is selected based on the hand posture of the initial touch gesture and the hand posture of the subsequent touch gesture.

6. The method of claim 1, where the initial touch gesture is executed by a first hand and the subsequent touch gesture is executed by a second hand.

7. The method of claim 1, where the mode constraint is set until the initial touch gesture terminates.

8. The method of claim 1, where the mode constraint is set until a termination gesture is executed.

9. The method of claim 1, where the initial touch gesture is a rail gesture, and where the mode constraint is a rotation constraint.

10. The method of claim 9, where the rail gesture is characterized by a substantially straight, elongated contact silhouette.

11. The method of claim 1, where the initial touch gesture is a corner gesture, and where the mode constraint is one of a plurality of mode constraints including a translation constraint and a rotation constraint.

12. The method of claim 11, where the corner gesture is characterized by a contact silhouette having two segments forming a corner.

13. The method of claim 1, where the initial touch gesture is a pound gesture, and where the mode constraint is one of a plurality of mode constraints including a translation constraint and a scale constraint.

14. The method of claim 13, where the pound gesture is characterized by a fist-shaped contact silhouette.

15. The method of claim 1, where the touch-input receptor is a touch screen displaying the virtual workspace.

16. A method of controlling a virtual object within a virtual workspace, comprising:
   recognizing a first hand posture of an initial touch gesture directed to a touch display;
   recognizing a second hand posture of a subsequent touch gesture directed to the touch display;
   setting a mode constraint based on the first hand posture and the second hand posture, the mode constraint specifying a constrained parameter of a virtual object that is to be maintained responsive to the initial touch gesture and the subsequent touch gesture; and
   modulating an unconstrained parameter of the virtual object responsive to the initial touch gesture and the subsequent touch gesture while maintaining the constrained parameter of the virtual object in accordance with the mode constraint.

17. The method of claim 16, where the mode constraint specifies a plurality of constrained parameters of the virtual object that are to be maintained responsive to the initial touch gesture and the subsequent touch gesture.

18. The method of claim 16, where the mode constraint is one of a plurality of different mode constraints, each of the plurality of different mode constraints being associated with a different hand posture and specifying a different set of one or more constrained parameters and one or more unconstrained parameters.

19. The method of claim 16, where the mode constraint is set until the initial touch gesture terminates.

20. A computing system, comprising:
   a display surface configured to receive touch input;
   a logic subsystem operatively connected to the display surface; and
   a data-holding subsystem holding instructions executable by the logic subsystem to:
      display on the display surface a virtual workspace including a virtual object;
      recognize a hand posture of an initial touch gesture directed to the display surface;
      set a mode constraint based on the hand posture, the mode constraint specifying a constrained parameter of a virtual object that is to be maintained responsive to a subsequent touch gesture;
      recognize a subsequent touch gesture directed to the display surface; and
      modulate an unconstrained parameter of the virtual object responsive to the subsequent touch gesture while maintaining the constrained parameter of the virtual object in accordance with the mode constraint.

* * * * *